United States Patent
Cho et al.

(10) Patent No.: US 8,155,465 B2
(45) Date of Patent: Apr. 10, 2012

(54) IMAGE PROCESSING METHOD, MEDIUM, AND SYSTEM

(75) Inventors: Yang-ho Cho, Hwaseong-si (KR);
Seung-sin Lee, Yongin-si (KR);
Ji-young Hong, Seongnam-si (KR);
Du-sik Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1211 days.

(21) Appl. No.: 11/907,710

(22) Filed: Oct. 16, 2007

(65) Prior Publication Data

US 2008/0101697 A1 May 1, 2008

(30) Foreign Application Priority Data

Oct. 25, 2006 (KR) .................. 10-2006-0104181

(51) Int. Cl.
*G06K 9/40* (2006.01)
*G06K 9/00* (2006.01)
(52) U.S. Cl. ....................... 382/254; 382/154
(58) Field of Classification Search .......... 382/162–172, 382/190, 260–270, 203, 199, 248, 224–228, 382/298–299, 305; 358/518–523, 538, 586; 345/597–618, 581, 634
See application file for complete search history.

(56) References Cited

U.S. PATENT DOCUMENTS

| | | | | | |
|---|---|---|---|---|---|
| 5,481,628 | A | * | 1/1996 | Ghaderi | 382/261 |
| 5,854,617 | A | * | 12/1998 | Lee et al. | 345/102 |
| 6,845,181 | B2 | * | 1/2005 | Dupin et al. | 382/274 |
| 6,947,591 | B2 | * | 9/2005 | Risson | 382/164 |
| 7,003,153 | B1 | * | 2/2006 | Kerofsky | 382/168 |
| 7,103,218 | B2 | * | 9/2006 | Chen et al. | 382/170 |
| 7,289,154 | B2 | * | 10/2007 | Gindele | 348/364 |
| 7,352,410 | B2 | * | 4/2008 | Chou | 348/673 |
| 7,412,105 | B2 | * | 8/2008 | Wilensky | 382/254 |
| 7,466,868 | B2 | * | 12/2008 | Wilensky | 382/254 |
| 7,773,158 | B2 | * | 8/2010 | Yamashita et al. | 348/678 |

FOREIGN PATENT DOCUMENTS

| | | |
|---|---|---|
| JP | 2002-014660 | 1/2002 |
| JP | 2004-102244 | 4/2004 |
| KR | 10-2002-0080574 | 10/2002 |
| KR | 10-2005-0023232 | 3/2005 |
| KR | 10-2005-0046162 | 5/2005 |

* cited by examiner

*Primary Examiner* — Andrae S Allison
(74) *Attorney, Agent, or Firm* — Staas & Halsey LLP

(57) ABSTRACT

An image processing method, medium, and system. The image processing method includes classifying an input image into predetermined image categories based on a feature of a brightness histogram of the input image, and adjusting a brightness of the input image based on grayscale functions corresponding to the image categories and positions of pixels making up the input image.

25 Claims, 10 Drawing Sheets

IMAGE PROCESSING METHOD, MEDIUM, AND SYSTEM

CROSS-REFERENCE TO RELATED APPLICATIONS

This application claims priority from Korean Patent Application No. 10-2006-0104181 filed on Oct. 25, 2006 in the Korean Intellectual Property Office, the disclosure of which is incorporated herein by reference in its entirety.

BACKGROUND

1. Field

One or more embodiments of the present invention relates to an image processing method, medium, and system, and more particularly, to an image processing method, medium, and system capable of maintaining a brightness for images displayed with low power consumption to have brightness similar to a normal power consumption display brightness.

2. Description of the Related Art

Recently, portable terminals such as mobile phones, PDAs (Personal Digital Assistants), or PMPs (Portable Multimedia Players) have become widely used. Even though such portable terminals are mobile, they typically have a limited power supply. Generally, though, users also typically want to use portable terminals for long periods of time without charging or changing batteries. Therefore, technologies surround the reducing of the power consumption of the portable terminals has become important.

However, one cause of increased power consumption is the large amount of power consumed by the driving unit of a display of the portable terminal. In order to reduce the power consumption of the portable terminal, it has been proposed to reduce the brightness of a light source (for example, a backlight of a LCD) of the display during a power save mode. In this case, with such a power save mode, the inventors of the present invention have found that it is still desirable for an image processing method to display images with a same or similar brightness as the original displaying, just as if the same images were shown in a normal mode.

SUMMARY

An aspect of one or more embodiments of the present invention is to improve the brightness of images when displayed with low power consumption.

Additional aspects and/or advantages will be set forth in part in the description which follows and, in part, will be apparent from the description, or may be learned by practice of the invention.

To achieve the above and/or other aspects and advantages, embodiments of the present invention include an image processing method, including performing a classifying of an input image into predetermined image categories based on a feature of a brightness histogram of the input image, and adjusting a brightness for pixels of the input image based on brightness weighting functions corresponding to a result of the classifying of the input image and respective positions of the pixels, such that a classification of the input image into one of the predetermined image categories controls the adjusting of the brightness for the pixels of the input image through application of a corresponding brightness weighting function for that one predetermined image category.

To achieve the above and/or other aspects and advantages, embodiments of the present invention include an image processing system, including a classifying unit to perform a classifying of an input image into predetermined image categories based on a feature of a brightness histogram of the input image, and a brightness adjusting unit to adjust a brightness for pixels of the input image based on brightness weighting functions corresponding to a result of the classifying unit and respective positions of the pixels, such that a classification of the input image by the classifying unit into one of the predetermined image categories controls the adjusting of the brightness for the pixels of the input image by the brightness adjusting unit through application of a corresponding brightness weighting function for that one predetermined image category.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Figure 1:
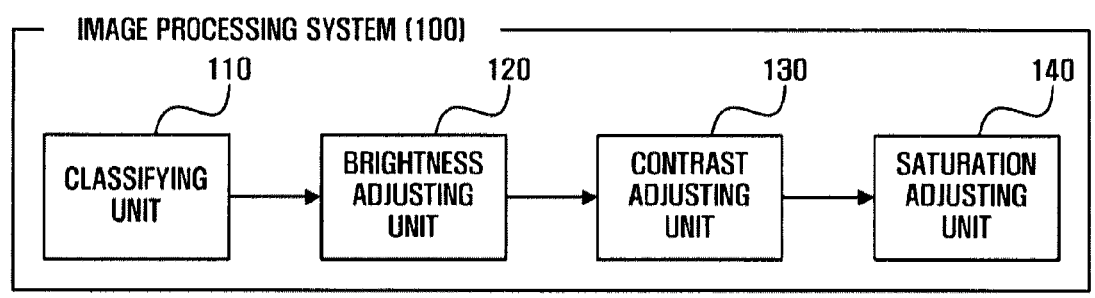
FIG. 1 illustrates an image processing system, according to an embodiment of the present invention.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates an image processing system 100, according to an embodiment of the present invention. The image processing system 100 may include a classifying unit 110, a brightness adjusting unit 120, a contrast adjusting unit 130, and a saturation adjusting unit 140, for example. The image processing system 100 may be a display or mounted within such a display, or may be a terminal including a display, and may further control the brightness of an input image on the basis of a power supply mode of the display or a brightness distribution characteristic of the input image, for example. In one embodiment, the display is an LCD display, and the control of the brightness is a control of the brightness of an image. However, it is noted that embodiments of the present invention are not limited thereto, and embodiments may be set forth with differing display types and/or different brightness control.

The classifying unit 110 may classify the input image into image categories depending on the brightness distribution of the input image, for example. More specifically, for example, the classifying unit 110 may classify the input images into image categories having a most similar feature to that of the brightness histogram of the input image, among a plurality of image categories having different features. Here, the image categories refer to a model representing the brightness distribution characteristics of various images, and the type and the number of image categories may be preset before classification. Hereinafter, as only en example, the classifying unit 100 will be discussed in greater detail through reference to FIGS. 2 through 5.

Figure 2:
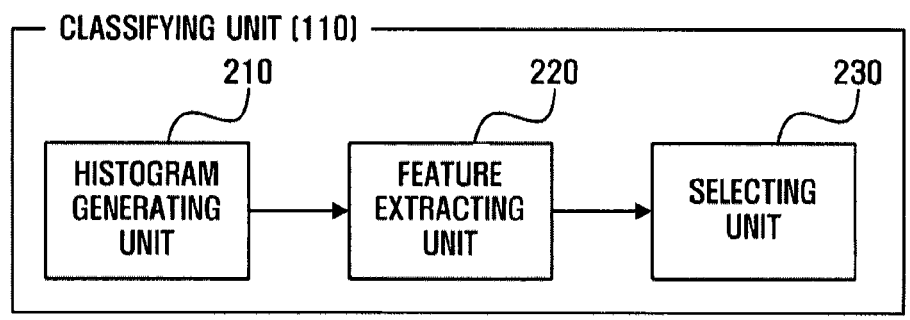
FIG. 2 illustrates a classifying unit, such as that of FIG. 1, according to an embodiment of the present invention.

FIG. 2 illustrates a classifying unit 110, such as that of FIG. 1, according to an embodiment of the present invention. The classifying unit 110 may include a histogram generating unit 210, a feature extracting unit 220, and a selecting unit 230, for example.

The histogram generating unit 210 may generate a brightness histogram that represents the brightness distribution of the input image. In order to generate the brightness histogram, the brightness value of pixels of the input image can be calculated. As an example, the brightness value may be calculated by using a NTSC (National Television Systems Committee) standard computational equation, such as the below Equation 1, for example.

$$Y = 0.288R + 0.587G + 0.114B \qquad \text{Equation 1}$$

Here, R, G, and B respectively represent red, green, and blue component values of a target pixel, e.g., a pixel whose brightness values are being calculated, and Y represents a brightness value of the target pixel. Here, briefly, it is noted that Equation 1 may be used when colors of the input image are represented on the basis of the RGB color space. If the colors of input image are represented on the basis of the different type of color space, the brightness value may be calculated using a different technique. Accordingly, as embodiments of the present invention are not limited to such a brightness value calculating technique, even though the input image may be represented in the RGB color space, for example, differing brightness value calculating techniques other than the NTSC standard computational equation may be used. For example, if the input image is represented in a color space already including a brightness value, the process of calculating the brightness value may be omitted.

Figure 3:
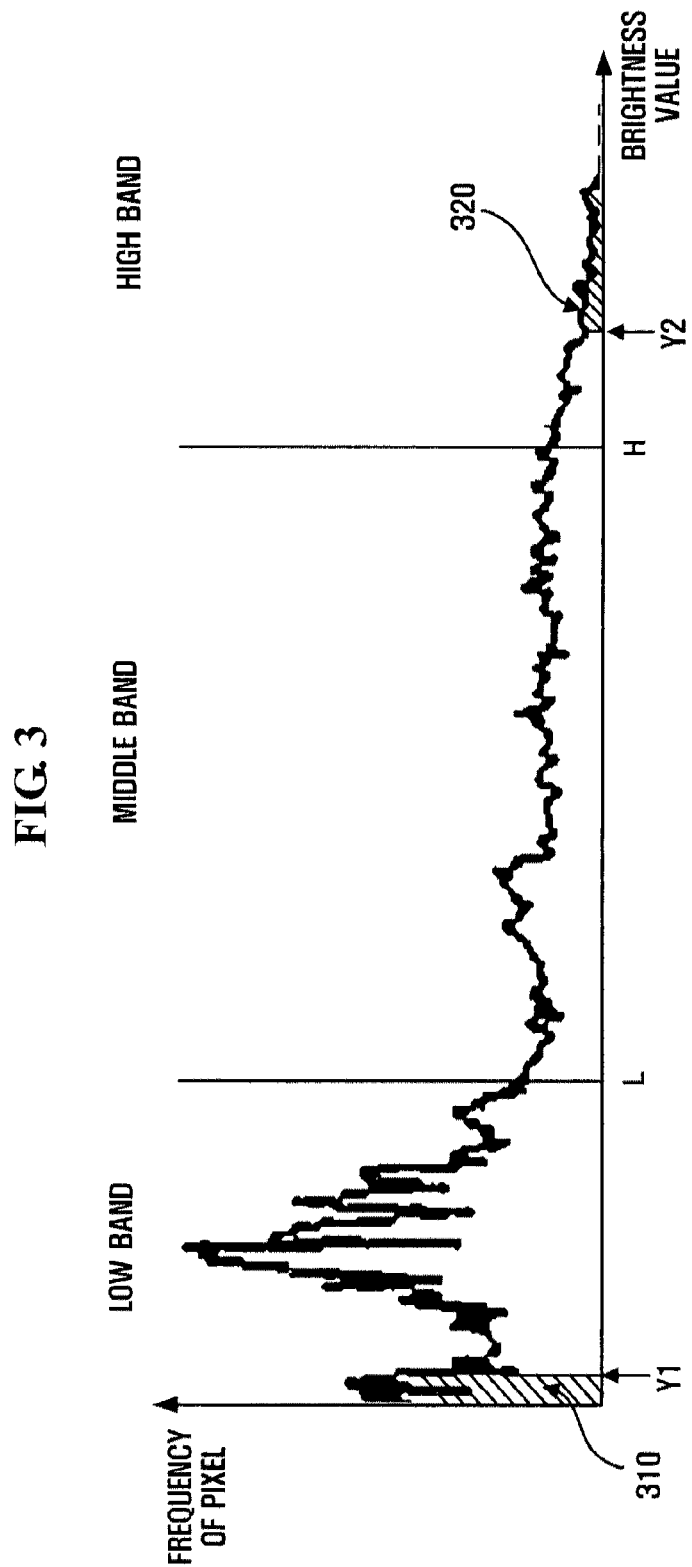
FIG. 3 illustrates a brightness histogram of an arbitrary input image.

FIG. 3 illustrates a brightness histogram of an arbitrary input image, with the horizontal axis of the brightness histogram of FIG. 3 representing a brightness value. For example, if the input image is an 8 bit image, the brightness value may be a value within a range between 0 and 255. Further, the vertical axis of the brightness histogram represents the pixel frequencies corresponding to the brightness values. Here, the term pixel frequencies corresponds to the number of pixels having the corresponding brightness value.

Referring to FIG. 2 again, the feature extracting unit 220 may extract a feature of the brightness histogram, e.g., as provided by the histogram generating unit 210. The referenced feature of the brightness histogram is a parameter that can be used to determine the image category of the input image, for example, and a plurality of features can be extracted from one brightness histogram. In one embodiment, which of the potential parameters that may be used as the feature of the brightness histogram may be predetermined before classification, e.g., during the designing stage of the image processing system 100. An example parameter that represents the brightness histogram according to an embodiment will now be described in greater detail with reference to FIG. 3.

As shown in FIG. 3, the brightness range can be divided into a low band, a middle band, and a high band, for example, noting that alternative division techniques are also available. In this example, the brightness range refers to the number of grayscales available for each pixel. For example, pixels that configure the 8-bit image can have a brightness value within the range between 0 and 255. Therefore, the range of the brightness of the 8-bit image in this example is between 0 and 255.

The boundaries between the bands can be set to preferable positions, for example, which may be determined through experiment before classification, such that the position can represent the feature of the brightness histogram. For example, a boundary L between the low band the middle band may be set to be the lower 25% of the brightness range (for example, in the case of 8-bit image, the brightness value may be 63) and a boundary H between the middle band and the high band may be set to be the higher 25% of the brightness range (for example, in the case of 8-bit image, the brightness value may be 191).

Examples of the parameter that represents the feature of the brightness histogram may include HighSUM, LowSUM, MiddleSUM, Mean, ZeroBin, and Dynamic Range (hereinafter, referred to as DR), for example.

HighSUM refers the number of pixels that may be included in the high band, LowSUM refers the number of pixels that may be included in the low band, and MiddleSUM refers the number of pixels that may be included in the middle band. Mean refers an average of brightness values of pixels, e.g., all pixels, making up the input image (hereinafter, referred to as average brightness value).

DR indicates an effective range of the brightness value of the brightness histogram, and is defined as Max-Min. In this case, Max refers to a brightness value that when sequentially adding the frequencies of the brightness values from a low brightness value, the sum of the frequencies becomes 1%, for example, of the area of the brightness histogram. Min refers to a brightness value that when sequentially adding the frequencies of the brightness values from a high brightness value, the sum of the frequencies becomes 1% of the area of the brightness histogram. For example, in the brightness histogram of FIG. 3, if the area of a first region 310 is 1% of the total area of the brightness histogram, Max is Y1, and if the area of a second region 320 is 1% of the total area of the brightness histogram, Min is Y2. Therefore, DR of this brightness histogram may be represented by Y1-Y2, for example.

ZeroBin refers the number of pixels in the brightness range that have a brightness value whose frequency is smaller than a reference value that is 10%, for example, of a average of frequencies corresponding to the brightness value in the middle band.

Referring to FIG. 2, the selecting unit 230 may select an image category having a similar, e.g., a most similar, feature to that of the input image by analyzing the feature of the brightness histogram, e.g., as provided by the feature extracting unit 220. Example brightness histograms (hereinafter, referred to as representative histograms) that represent the feature of the image category according to this embodiment are shown in FIG. 4.

Referring to the representative histograms of FIG. 4, the features of brightness of the image categories will be described. The illustrated image category A represents an image in which the number of pixels in the middle band is larger than those of pixels in the low and high bands. The illustrated image category B represents an image in which the number of pixels in the high band is larger than those of pixels in the other bands, and the illustrated image category C represents an image in which the number of pixels in the low band is larger than those of pixels in the other bands. The illustrated image category D represents a high contrast image in which most of pixels are distributed in the high and low bands. The illustrated image category E represents an image in which the pixels are uniformly distributed in all of the bands, and the illustrated image category F represents an image whose brightness values are discretely distributed likes as the image produced by a graphical work. Here, it is noted that these representative histograms of the image categories shown in FIG. 4 is merely illustrative, and alternate and/or additional image categories having different brightness characteristics can equally be used.

Figure 4:
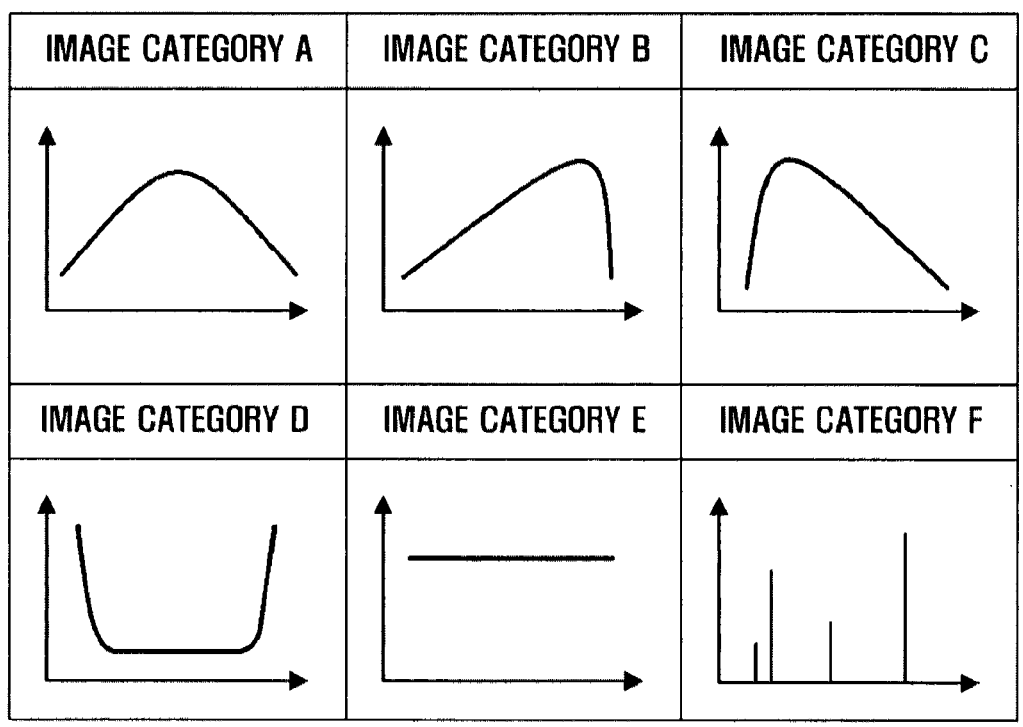
FIG. 4 illustrates a brightness histogram representing features of image categories, according to an embodiment of the present invention.
Figure 5:
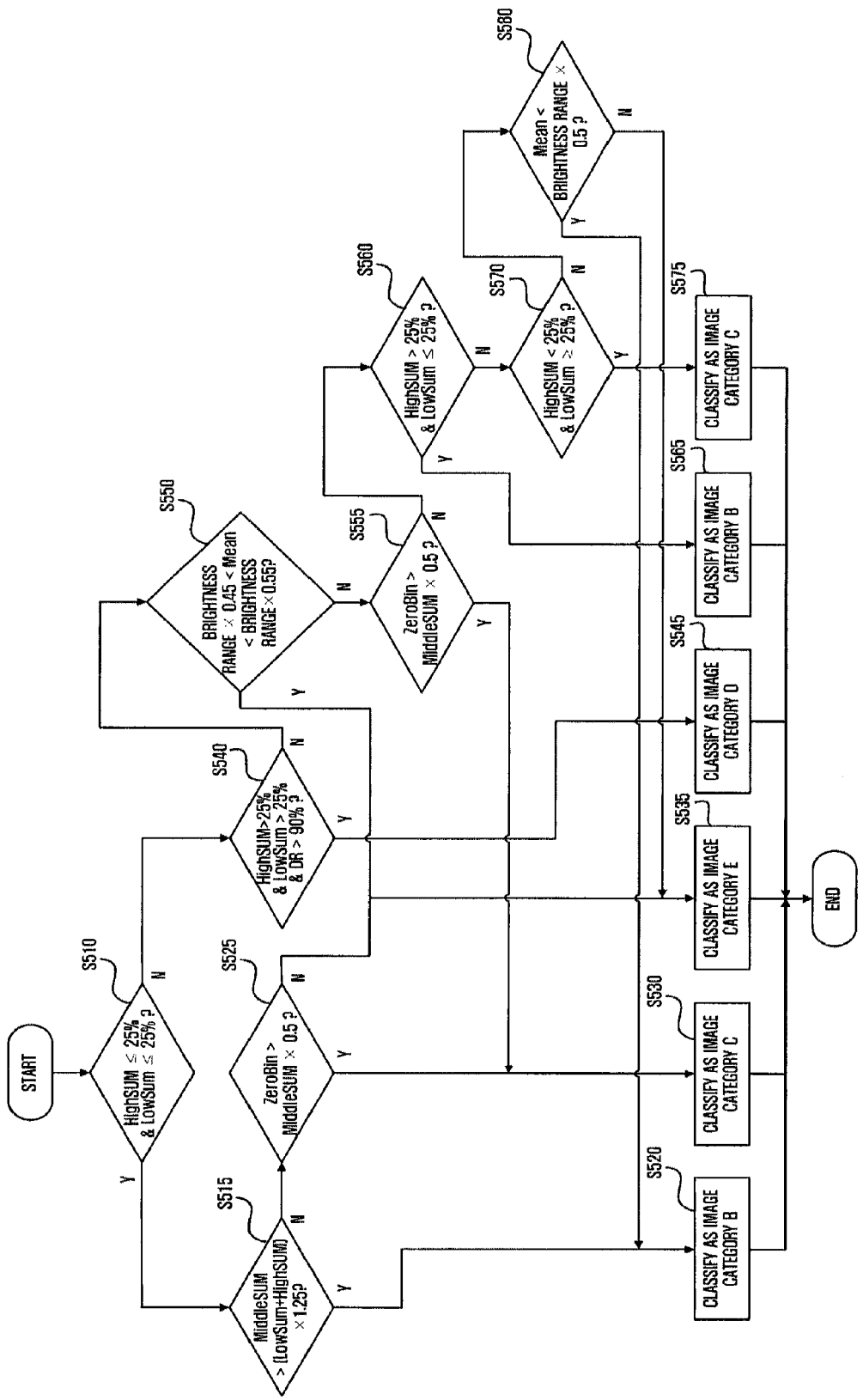
FIG. 5 illustrates an operating process of selecting an image category, such as by a selecting unit of FIG. 2, according to an embodiment of the present invention.

As described above, when the features of the brightness histogram that is used to classify the input images are High-SUM, LowSUM, MiddleSUM, Mean, ZeroBin, and DR, and the image categories have the brightness characteristics shown in FIG. 4, an example embodiment of the operating process, e.g., of the selecting unit 230, for selecting the image category can be seen in the flowchart of FIG. 5.

As shown, it may be determined whether HighSUM and LowSUM of the input image are equal to or less than 25% of the total number of pixels of the input image, in operation S510. In operation S510, if HighSUM and LowSUM of the input image are equal to or less than 25% of the total number of pixels, it may further be determined whether the Middle SUM is larger than 125% of the sum of HighSUM and Low-SUM, in operation S515. Here, in operation S515, if the Middle SUM is larger than 125% of the sum of HighSUM and LowSUM, image category A, for example, may be selected, in operation S520.

In contrast, in operation S515, if the Middle SUM is not larger than 125% of the sum of HighSUM and LowSUM, it may be determined whether ZeroBin is larger than a value obtained by multiplying MiddleSUM by 0.5, for example, in operation S525. Here, in operation S525, if ZeroBin is larger than a value obtained by multiplying MiddleSUM by this 0.5, the image category F, for example, may be selected, in operation S530, and if ZeroBin is not larger than a value obtained by multiplying MiddleSUM by this 0.5, the image category E, for example, may be selected, in operation S535.

However, in operation S510, if HighSUM and LowSUM of the input image are not equal to or less than 25% of the total number of pixels, it may be determined whether HighSUM and LowSUM are larger than 25% of the total number of pixels of the input image, for example, and the number of pixels included in DR is larger than 90% of the total number of pixels, for example, in operation S540. In operation S540, if HighSUM and LowSUM are larger than 25% of the example total number of pixels of the input image, and the number of pixels included DR is larger than 90% of the example total number of pixels, the image category D, for example, may be selected, in operation S545.

In operation S540, if HighSUM and LowSUM are not larger than 25% of the example total number of pixels of the input image, and the number of pixels included DR is not larger than 90% of the example total number of pixels, it may be determined whether Mean is larger than a value obtained by multiplying the brightness range by 0.45, for example, and smaller than a value obtained by multiplying the brightness range by 0.55, for example, in operation S550. Here, in operation S550, if Mean is larger than a value obtained by multiplying the brightness range by this 0.45 and smaller than a value obtained by multiplying the brightness range by this 0.55, the image category E, for example, may be selected, in operation S535.

In contrast, if Mean is not larger than a value obtained by multiplying the brightness range by this 0.45 and not smaller than a value obtained by multiplying the brightness range by this 0.55, it may be determined whether ZeroBin is larger than 0.5 times, for example, of MiddleSUM, in operation S555. Here, in operation S555, if ZeroBin is larger than this 0.5 times of MiddleSUM, the image category F, for example, may be selected, in operation S530.

Otherwise, if ZeroBin is not larger than this 0.5 times of MiddleSUM, it may be determined whether HighSUM is larger than 25% of the example total number of pixels and LowSUM is equal to or smaller than 25% of the example total number of pixels, for example, in operation S560. Here, in operation S560, if HighSUM is larger than 25% of the example total number of pixels and LowSUM is equal to or smaller than 25% of the example total number of pixels, the image category B, for example, may be selected, in operation S565.

In operation S560, if HighSUM is not larger than 25% of the example total number of pixels or LowSUM is not equal to or smaller than 25% of the example total number of pixels, it may be determined whether HighSUM is smaller than 25% of the example total number of pixels or LowSUM is equal to or larger than 25% of the example total number of pixels. In operation 570, if HighSUM is smaller than 25% of the example total number of pixels and LowSUM is equal to or larger than 25% of the example total number of pixels, the image category C, for example, may be selected, in operation S575.

In contrast, in operation 570, if HighSUM is not smaller than 25% of the example total number of pixels or LowSUM is not equal to or larger than 25% of the example total number of pixels, it may be determined whether Mean is smaller than a value obtained by multiplying the pixel range by 0.5, for example, in operation S580. Here, in operation S580, if Mean is smaller than a value obtained by multiplying the pixel range by this 0.5, the image category A, for example, may be selected, in operation S520, otherwise, the image category E, for example, may be selected, in operation S535.

Again, the described image category selection process shown in FIG. 5 is only one example, and embodiments of the present invention are not limited thereto, e.g., alternate classifying techniques could also be used.

Referring to FIG. 1 again, the brightness adjusting unit 120 may adjust the brightness for the input image, e.g., by controlling the brightness of the image, in accordance with the power supply mode and the image category of the input image. In this case, the power supply mode may indicate the amount of available power to the display to which the image processing system 100 may be mounted within or the system embodiment the display is a portion of. For example, in normal power mode, the display may be driven at a maximum power consumption level, and in low power mode, the power consumption of the display may be reduced to a predetermined lesser power level. Of course, the low power mode could be further divided into various power modes according to the rate of reduced power consumption. For example, if the rate of reduced power consumption is 30%, the corresponding mode could be referred to a first low power mode, and if the rate of reduced power consumption is 60%, the corresponding mode could be referred to a second low power mode, noting that alternative embodiments are equally available.

The brightness adjusting unit 120 may further use a TMF (Tone Mapping Function) corresponding to the image categories of the input image to effectively display the images at a low power consumption level. The TMF is a function for representing a pattern optimized to adjust the brightness of image in the corresponding image category at a low power consumption level and provides an output brightness value corresponding to input brightness value. A TMF may be obtained through experiment before adjustment may be set in the brightness adjusting 120 unit in advance.

Figure 6:
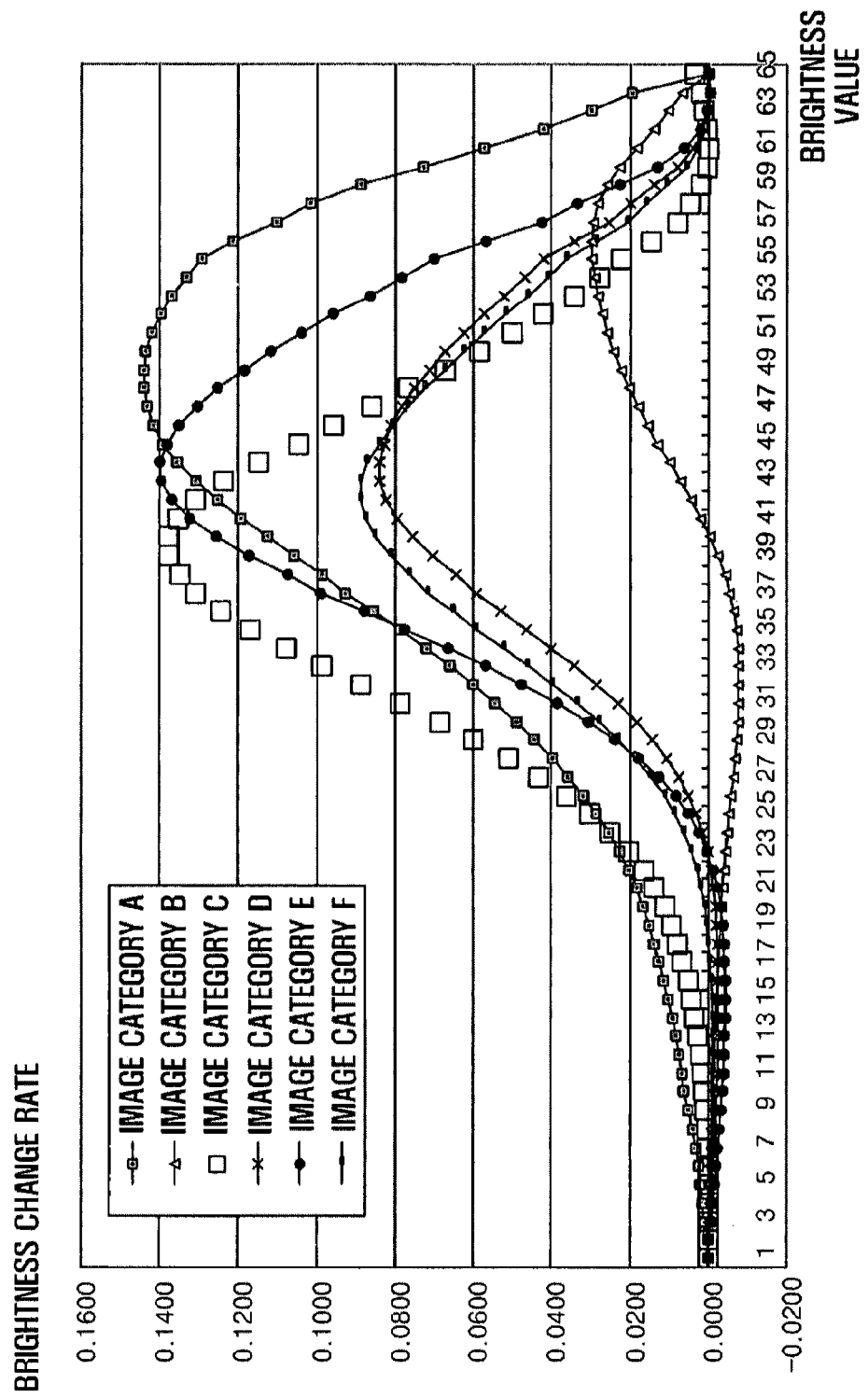
FIG. 6 is a graph showing a rate of brightness change using a TMF, according to an embodiment of the present invention.

FIG. 6 illustrates example rates of brightness change using a TMF, according to an embodiment of the present invention. The brightness change rate graphs of FIG. 6 correspond to the six image categories shown in FIG. 4, with the horizontal axis representing input brightness value, represented by a range between 0 and 63 by assuming a six-bit image, and with the vertical axis of the graph representing the brightness change rates corresponding to the input brightness values. Referring to FIG. 6, an example of changing the brightness of the input image will now be described. For example, when the input image is determined to fall within the image category E, the bright increase rate of the pixels having the brightness value of 43 is shown as 0.14. Therefore, the brightness of the adjusted corresponding pixel can be calculated as 43+(43*0.14)=49, for example.

Hereinafter, referring to FIGS. 7 and 8, an example of the brightness adjusting unit 120 will be described in greater detail.

Figure 7:
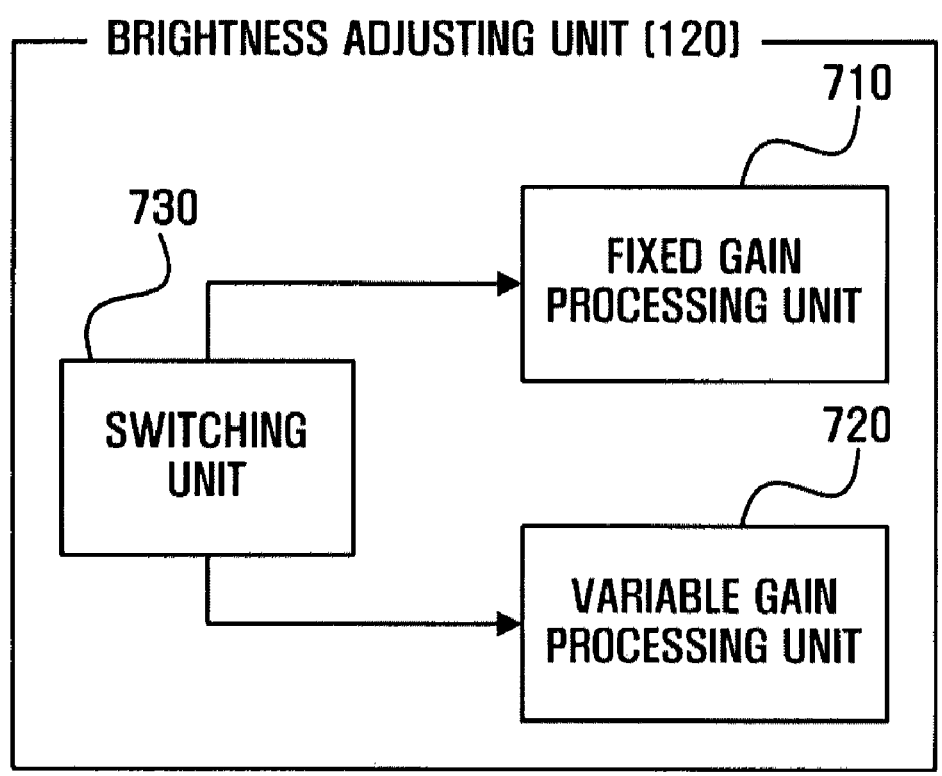
FIG. 7 illustrates a brightness adjusting unit, according to an embodiment of the present invention.
Figure 8:
FIG. 8 illustrates an example of a mapping of variable gains to be allocated to pixels making up an input image, according to an embodiment of the present invention.

FIG. 7 illustrates a brightness adjusting unit 120, such as that shown in FIG. 1, according to an embodiment of the present invention. Here, the brightness adjusting unit 120 may include a fixed gain processing unit 710, a variable gain processing unit 720, and a switching unit 730, for example.

The fixed gain processing unit 710 may adjust the brightness value of the input image using a fixed gain determined on the basis of the power reduction rate and the TMF corresponding to the image category of the input image, for example. In one embodiment, the brightness value adjusted by the fixed gain processing unit 710 may be represented by the below Equation 2, for example.

$$Y_{TMF\_out}=Y_{in}+(\Delta Y_{TMF} \times G_{TMF})$$ Equation 2

Here, $Y_{TMF\_out}$ is an example output brightness value for displaying images at low power consumption, and $Y_{in}$ is an input brightness value. Further, $\Delta Y_{TMF}$ is a brightness increase rate by the TMF corresponding to the image category of the input image and represented on the vertical axis of the graph of FIG. 6, for example. $G_{TMF}$ corresponds to a rate of reduced power supply, and the same value of $G_{TMF}$ can be applied to all of the pixels making the single input image. Of course, in an embodiment, $G_{TMF}$ may be varied depending on the power reduction rate. For example, as the power reduction rate is increased, the brightness of a light source (for example, a backlight of LCD) of a display may be decreased. Therefore, $G_{TMF}$ could be increased as the power reduction rate is increased, so that the brightness of the image is increased. In an embodiment, a preferable fixed gain corresponding to the rate of reduced power supply may be preset through experiment.

The variable gain processing unit 720 may adjust the brightness value of the input image using a variable gain determined depending on the positions of the pixels in the image and TMF corresponding to the image category of the input image, for example. In an embodiment, the brightness value adjusted by the variable gain processing unit 720 may be represented by the below Equation 3, for example.

$$Y_{TMF\_out}=Y_{in}+(\Delta Y_{TMF} \times \alpha_{gain}(x,y))$$ Equation 3

Here, $Y_{TMF\_out}$, $Y_{in}$, and $\Delta Y_{TMF}$ may be defined the same as for Equation 2. In Equation 3, the variables x and y represent the coordinate of the pixel that is being processed in the image (hereinafter, referred to as target pixel), and $\alpha_{gain}(x,y)$ represents a variable gain, and may vary based on the spatial position of the target pixel in the image.

In an embodiment, preferably, it may be possible to maintain the output brightness value, with the reduced power level, and the input brightness value to be equal to each other by making the variable gain be 0 at the center of the image, and increase the brightness increase rate by making the variable gain be maximum at the outer circumstance. Besides, the variable gain becomes increased toward the outer circumstance along a region between the center and the outer circumstance, thereby preventing the image distortion caused due to steep differences in brightness values of the image.

In order to calculate a variable gain that satisfies such an above condition, according to an embodiment of the present invention, an inverted Gaussian function can be used. A Gaussian function according to an embodiment of the present invention may be represented by the below Equation 4, for example.

$$g(x,y) = \frac{1}{2\pi\sigma^2} e^{-\frac{\left[x-\frac{width}{2}\right]^2}{A} + \frac{\left[y-\frac{height}{2}\right]^2}{B}}{2\sigma^2}}$$ Equation 4

Here, 'width' and 'height' represent the horizontal and vertical sizes of the image, respectively, and A and B represent constants that change the Gaussian function into an elliptical type according to the aspect ratio of the input image. Further, the inversed Gaussian that is normalized from the Gaussian function of Equation 4 may be represented by the below Equation 5, for example.

$$f(x,y) = 1 - \frac{g(x,y)}{\max[g(x,y)]}$$ Equation 5

If using the inversed Gaussian of Equation 5, the variable gain may be further represented by the below Equation 6, for example.

$$\alpha_{gain}(x,y) = MAX_{gain} \cdot f(x,y)$$ Equation 6

Here, $MAX_{gain}$ represents a maximum gain corresponding to the image category of the input image, and may be preset to have an appropriate value to adjust the brightness of the input image, e.g., determined through experiment. For example, if the maximum gain $MAX_{gain}$ is 4, and the size of the input image is 15*20, examples of variable gains that may be allocated to pixels making up the input image are shown in the mask shown in FIG. 8. In FIG. 8, the illustrated weighted blocks correspond the pixels making up the input image 800 and the weightings within the blocks representing the variable gains that may be allocated to the corresponding pixels. As shown in FIG. 8, the variable gain that may be allocated to the center region of the input image 800 may be 0, while the variable gain along the outer circumference of the input image 800 is 4, as the maximum gain. Thus, in this example, the variable gains that are allocated to the pixels from the center region to the outer circumference become increases from 0 to 4.

In an embodiment, the switching unit 730 may control the operations of the fixed gain processing unit 710 and the variable gain processing unit 720 in accordance with power mode and the image categories of the input image. Further, information concerning the power mode may be obtained internally or through an external module (not shown). For example, the information concerning the power mode could be obtained by a control unit (not shown) that controls the aforementioned example display.

According to an embodiment of the present invention, the image processing system 100 may preferably operate when the display operates in the low power consumption mode, for example, that is, when the power consumption level of the display is reduced. Therefore, in an example normal power mode where the power consumption level has not been reduced, the switching unit 730 may deactivate the example fixed gain processing unit 710 and the variable gain processing unit 720, e.g., because the output image may actually become distorted when the brightness of the input image is increased while in the normal power mode.

In an example low power mode, in such an embodiment, the switching unit 730 may thus activate one of the fixed gain processing unit 710 and the variable gain processing unit 720. If the rate of reduced power is not larger than a threshold value, the switching unit 730 may activate the fixed gain processing unit 710. When the fixed gain processing unit 710 increases the brightness of the input image (e.g., when Equation 2 is used), it may be possible to display the image having a brightness similar to that in the normal power mode, even at the low power consumption level.

However, the fixed gain that is used in the fixed gain processing unit 710 may be caused to increase as the power reduction rate increases. Therefore, if the power reduction rate exceeds the threshold value, the amount of increased brightness with respect to the input image may become excessively increased. In this case, since the brightness value becomes saturated, the observable definition of the image may become lowered. Especially, if most of pixels disposed at the center of the input image have a high brightness value, the image quality may become easily deteriorated due to the result processed by the fixed gain processing unit 710, in which there is the larger power reduction rate than the threshold value.

Therefore, if the power reduction rate is larger than the example threshold value, the switching unit 730 could activate the variable gain processing unit 720. As described above, the variable gain processing unit 720 varies the gain to be allocated to the target pixel, depending on the position in the image. Accordingly, since the center of the output image processed by the variable gain processing unit 720 can be controlled to have the same brightness as the center of the input image, the definition of the image can be controlled to not deteriorate. Further, since the outer circumference of the image may be less important, e.g., due to human visual properties, the variable gain processing unit 720 may set the gain at the outer circumference of the image to be high to improve the brightness rather than the definition of the image. In this case, the brightness of the image perceived by users approaches the brightness of the image at normal power consumption. Besides, since the gain is gradually increased from the center to the outer circumference of the image, it becomes possible to prevent image distortion due to steep differences in brightness within the adjusted image.

In addition, or in the alternative, if the power reduction rate is larger than the threshold value, the switching unit 730 may activate the fixed gain processing unit 710 so as to process an input image included in a specific image category. For example, referring to FIG. 4, the image category D can represent an image in which most of pixels are concentrated at both ends of the brightness range, and the image category F can represent an image in which most of pixels are discretely distributed to correspond to specific brightness value. Therefore, if the images fall within the above image categories D and F and are processed by the variable gain processing unit 720, the image distortion may become more increased. Images falling within the above image categories D or F, for example, may actually have special effects image or represent special graphical images. Accordingly, the switching unit 730 may selectively activate the fixed gain processing unit 710 so as to process an input image included in such an image category.

Referring to FIG. 1 again, the contrast adjusting unit 130 may adjust the contrast of the image processed by the brightness adjusting unit 120. For this process, the contrast adjusting unit 130 may determine the final brightness value for each of the adjusted pixels based on the brightness characteristics of the pixels making up the input image. Hereinafter, a contrast adjusting unit 130 embodiment will be described in greater detail with reference to FIGS. 9 and 10.

Figure 9:
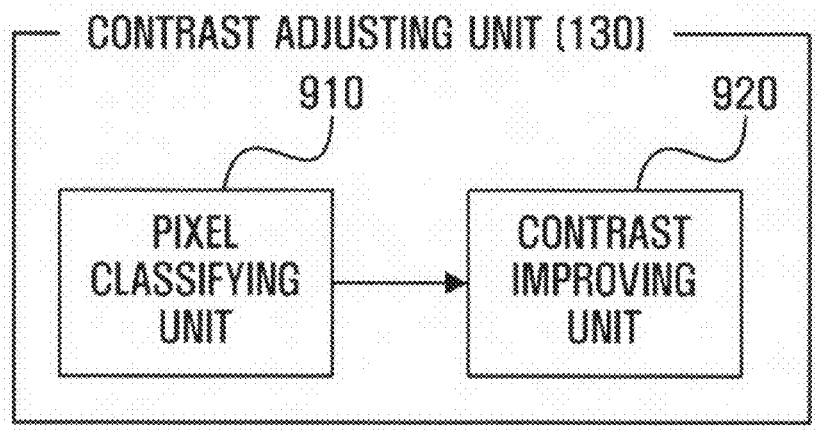
FIG. 9 illustrates a contrast adjusting unit, according to an embodiment of the present invention.

FIG. 9 illustrates contrast adjusting unit 130, such as that shown in FIG. 1, according to the embodiment of this invention. The contrast adjusting unit 130 may include a pixel classifying unit 910 and a contrast improving unit 920, for example.

The pixel classifying unit 910 may classify pixels of the input image on the basis of the brightness characteristics. According to one embodiment, the pixels may be classified into three example groups, and a global contrast rate and a local contrast rate of the target pixel may be used as classification criteria.

The global contrast rate can be a rate of average brightness value of the input image to the brightness value of the target pixel, and may be represented by the below Equation 7, for example.

$$Cont = \frac{Y_{avg}}{Y_{in}} \qquad \text{Equation 7}$$

Here, Cont refers to a global contrast rate, $Y_{avg}$ refers to the average brightness value of the input image and $Y_{in}$ refers the brightness value of the target pixel. $Y_{avg}$ and $Y_{in}$ are values that may be predetermined from the input image before being processed by the brightness adjusting unit 120.

If the global contrast rate of the target pixel is larger than 1, it can mean that the target pixel belongs to a dark pixel in the input image. In this case, the pixel classifying unit 910 can classify the target pixel as a globally dark pixel (GDP). In contrast, if the global contrast rate of the target pixel is not larger than 1, the target pixel may be determined to belong to a light pixel in the input image. In this case, the pixel classifying unit 910 may classify the target pixel as a globally light pixel (GLP).

Figure 10:
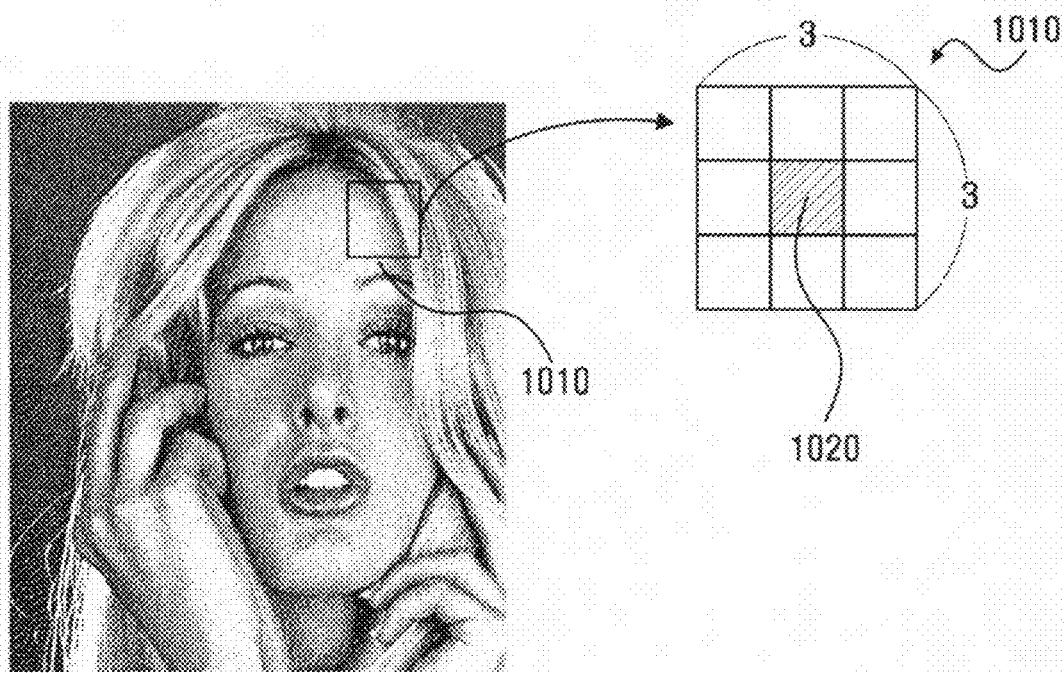
FIG. 10 illustrates an average brightness of a target pixel and a mask including the target pixel, according to an embodiment of the present invention.

Thus, here, the pixel classifying unit 910 may reclassify pixels that are classified as GLPs on the basis of the local contrast rate. The local contrast rate refers to a rate between the brightness of the target pixel and the average pixel value of pixels included a predetermined size of mask including the target pixel, when using the result processed by the brightness adjusting unit 120 as a reference. For example, as shown in FIG. 10, when using a mask having the size of 3*3, nine pixels are presented in the mask, and the target pixel is disposed at the center of the mask. The local contrast rate according to this embodiment may be represented by the below Equation 8, for example.

$$Cont_{TMF} = \frac{Y_{TMF\_mask\_avg}}{Y_{TMF\_out}} \qquad \text{Equation 8}$$

In Equation 8, $Cont_{TMF}$ refers to a local contrast rate, $Y_{TMF\_mask\_avg}$ refers to the average brightness value of pixels included in the mask including the target pixel, and $Y_{TMF\_out}$ refers to the brightness value of the target pixel. $Y_{TMF\_mask\_avg}$ and $Y_{TMF\_out}$ are values determined from the input image after being processed by the brightness adjusting unit 120, for example.

The pixel classifying unit 910 may classify a target pixel whose local contrast rate is larger than 1 as a locally dark pixel (LCD), and a target pixel whose local contrast is not larger than 1 may be classified as a locally light pixel (LLP).

The contrast improving unit 920 may vary the brightness values of the pixels that are classified by the pixel classifying unit 910 to improve the contrast of the image. The contrast improving unit 920 reduces the brightness value, obtained by the contrast adjusting unit 120, of the pixel that is classified as a GDP. Preferably, in an embodiment, the amount of reduced brightness value of the pixel that is classified as a GDP is proportional to the global contrast rate, and may be represented by the below Equation 9, for example.

$$Y_{out} = Y_{TMF\_out} - (Y_{TMF\_out} \times \alpha_{GDP} \times Cont) \qquad \text{Equation 9}$$

Here, $Y_{out}$ refers to a final brightness value, e.g., as output by the contrast improving unit 920, $Y_{TMF\_out}$ refers to a brightness value of the target pixel, e.g., as obtained by processing by the brightness adjusting unit 120, and $\alpha_{GDP}$ is a weight that may be preset before adjustment, e.g., through experimentation. Cont indicates a global contrast rate that may be calculated by using the above Equation 7, for example.

However, the contrast improving unit 920 reduces the brightness value of a pixel that is reclassified as an LDP, among pixels that are classified as GDPs, and increases the brightness value of a pixel that is reclassified as an LLP. The brightness value of the pixel that is classified as GDP can be adjusted by the contrast improving unit 920 and may be represented by the below Equation 10, for example.

$$Y_{out} = Y_{TMF\_out} + \alpha \qquad \text{Equation 10}$$

Here, $Y_{out}$ refers to a final brightness value, e.g., as output by the contrast improving unit 920, $Y_{TMF\_out}$ refers to a brightness value of the target pixel, e.g., as processed by the brightness adjusting unit 120, and $\alpha$ refers to a variation of the brightness which is a real number, and preferably an integer in an embodiment. If the target pixel is classified as an LDP, $\alpha$ may be a negative value, otherwise, if the target pixel is classified as an LLP, $\alpha$ may be a positive value.

Further, here, $\alpha$ may be set such that a local contrast rate when using the brightness value finally processed by the contrast improving unit 920 (hereinafter, referred to as a final local contrast rate) and a local contrast rate when using the brightness value of an initial input image (hereinafter, referred to as initial local contrast rate) are equal to each other. The initial local contrast rate and the final local contrast rate may, thus, be represented by the below Equations 11 and 12, respectively, for example.

$$Cont_{in} = \frac{Y_{in\_mask\_avg}}{Y_{in}} \qquad \text{Equation 11}$$

Here, $Cont_{in}$ refers to an initial local contrast rate, $Y_{in\_mask\_avg}$ refers to an average brightness value of pixels included in the mask, and $Y_{in}$ refers to a brightness value of the target pixel. $Y_{in\_mask\_avg}$ and $Y_{in}$ may be obtained by the initial input image.

$$Cont_{local\_enhance} = \frac{Y_{TMF\_mask\_avg} + \frac{\alpha}{A_{mask\_size}}}{Y_{TMF\_out} + \alpha} \qquad \text{Equation 12}$$

Here, $Cont_{local\_enhance}$ refers to a final local contrast rate, $Y_{TMF\_mask\_avg}$ and $Y_{TMF\_out}$ can be the same as in Equation 8, and $\alpha$ refers to a variation of brightness values of the pixels that are classified as GLPs, as described in the above Equation 10. Further, $A_{mask\_size}$ may refer to the size of the mask.

As described above, the variation $\alpha$ of brightness values of the pixels that are classified as GLPs may be set such that the initial local contrast rate and the final local contrast rate are equal to each other. Therefore, when the expression $Cont_{total\_enhance} = Cont_{in}$ is calculated by using the above Equations 11 and 12, $\alpha$ may be obtained by the below Equation 13, for example.

$$\alpha = \frac{Cont_{in} \cdot Y_{TMF\_out} - Y_{TMF\_mask\_avg}}{\left[\frac{1}{A_{mask\_size}} - Cont_{in}\right]} \qquad \text{Equation 13}$$

Figure 11:
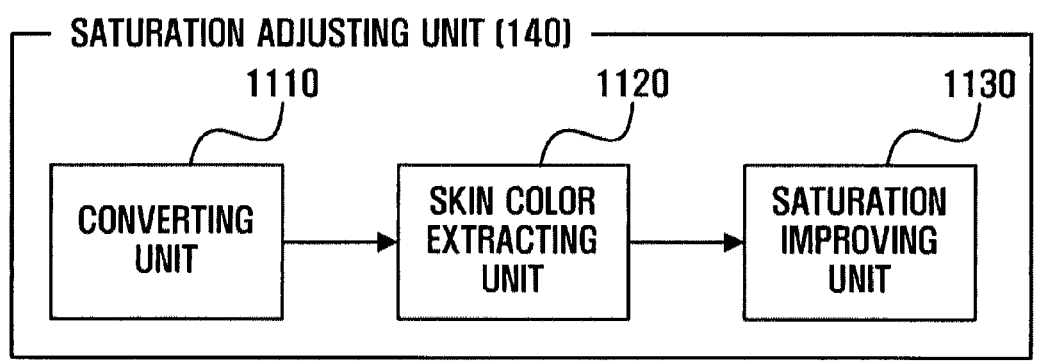
FIG. 11 illustrates a saturation adjusting unit, according to an embodiment of the present invention.

Referring to FIG. 1 again, the saturation adjusting unit 140 may adjust a saturation of the image processed by the contrast adjusting unit 130. It is because the saturation is relatively decreased as the brightness of the input image is totally increased in order to be performed at low power consumption. The saturation adjusting unit 140 may include a converting unit 1110, a skin color extracting unit 1120, and a saturation improving unit 1130, for example, as shown in FIG. 11.

The converting unit 1110 may convert a color space of the input image into a color space that is capable of expressing a saturation component. For example, the converting unit 1110 may convert the input image into an input image based on an HVS color space.

The skin color extracting unit 1120 may extract a skin color region from the input image. In the case of HSV color space, the skin color can be extracted by using a hue and saturation. In this case, the skin color may be previously set by a hue value and a saturation value in the threshold range, for example. Further, the skin color may be arbitrarily set depending on an object of a user that uses the aforementioned display.

The saturation improving unit 1130 may improve the saturation of the input image. By using the saturating improving unit 1130, it may, thus, be possible to compensate the reduced saturation of the input image that is processed by the brightness adjusting unit 120 and the contrast adjusting unit 130. The saturation improving unit 1130 may, thus, decrease the degree of the saturation improvement in the skin color region to prevent the deterioration of the skin color, and increase the degree of the saturation improvement in regions other than the skin color region. The saturation improving unit 1130 may use the below Equations 14 and 15, for example, in order to improve the saturation of the input image. Equation 14 may be used for pixels having skin colors, and Equation 15 may used for pixels having colors other than the skin colors, noting that alternatives are equally available.

$$S_{out} = S_{in} + (S_{in} \cdot \alpha) \quad \text{Equation 14}$$

$$S_{out} = S_{in} + (S_{in} \cdot \beta) \quad \text{Equation 15}$$

Here, $S_{out}$ is a final saturation value to be output, and $S_{in}$ an input saturation value. Further, $\alpha$ and $\beta$ are saturation increase rates which may appropriately be preset, e.g., through experiment, and $\beta$ may be preferably larger than $\alpha$, for example.

Figure 12:
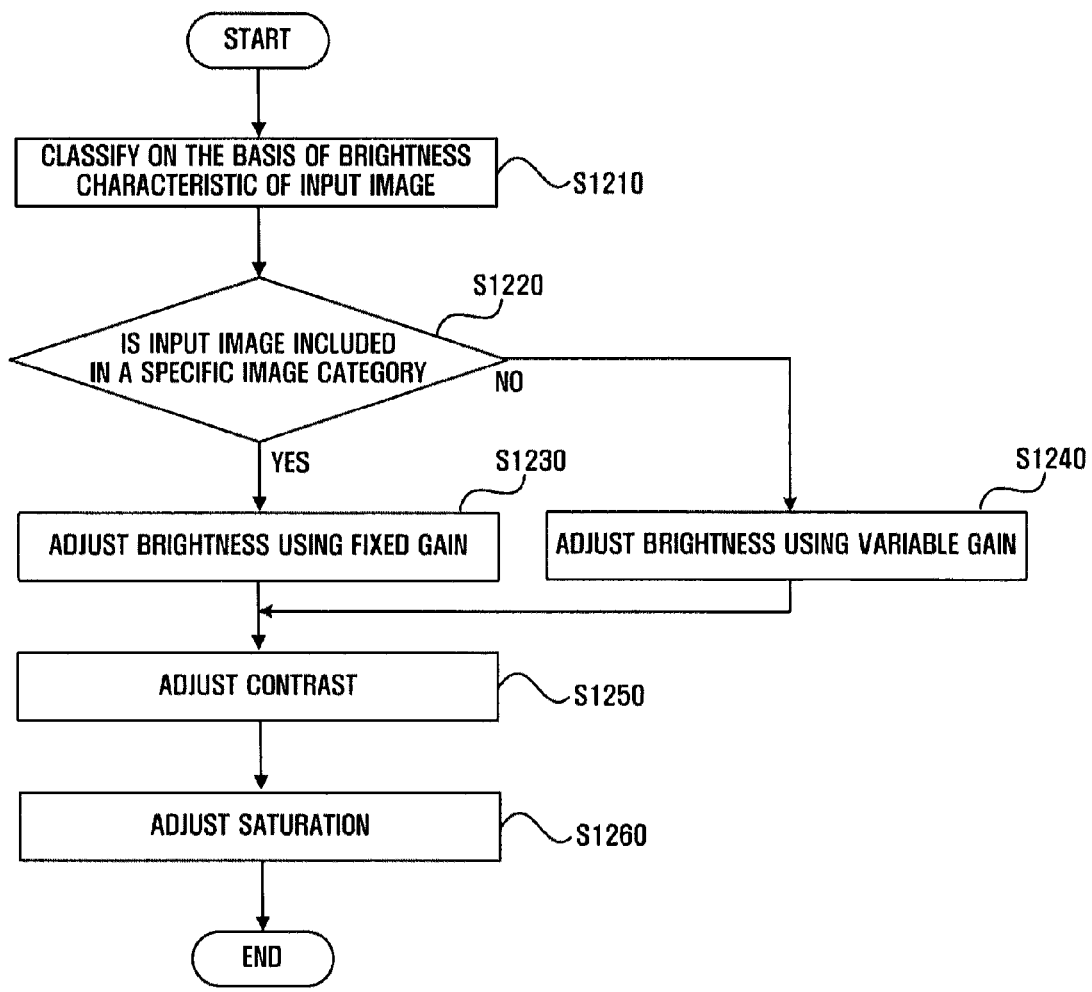
FIG. 12 illustrates an image processing process, according to an embodiment of the present invention.

Hereinafter, referring to FIG. 12, an image processing operation, such as with the operation of the image processing unit 100 of FIG. 1, according to an embodiment of the present invention will now be described in further detail.

When an input image is supplied or available, the classifying unit 110 may classify the input image into image categories based on brightness characteristics of the input image, in operation S1210.

Thereafter, it may be determined whether the image category of the input image falls within a specific image category, e.g., by the brightness adjusting unit 120, in operation S1220. In this case, the specific image category may correspond an image category including abnormal brightness information, such as the aforementioned image categories D or F as described with reference to FIG. 4, and may be predetermined before adjustment.

In operation S1220, if the image category of the input image falls within a specific image category, the brightness of the input image may be adjusted using a fixed gain, e.g., by the brightness adjusting unit 120, in operation S1230. In contrast, in operation S1220, if the image category of the input image does not fall within a specific image category, the brightness of the input image may be adjusted using a variable gain, e.g., by the brightness adjusting unit 120, in operation S1240. More specifically, in an embodiment, operation S1230 may be performed by the fixed gain processing unit 710, described with reference to FIG. 7, and operation S1240 may be performed by the variable gain processing unit 720 described with reference to FIG. 7.

Thereafter, the contrast of the processed input image, e.g., as processed by the brightness adjusting unit 120, may be adjusted, in operation S1250, and the saturation of the processed input image, e.g., after being processed by the contrast adjusting unit 130, may be adjusted, in operation S1260. Example input image processing processes performed by the contrast adjusting unit 130 and the saturation adjusting unit 140 have already been fully described above, and thus further detailed description thereof will be omitted.

In the above description, elements of the image processing system 100, for example, may be embodied by modules. The modules may refer to hardware elements such as FPGA (field programmable gate array) and/or ASIC (application specific integrated circuit), and perform operations. However, the modules are not limited to the software and/or the hardware aspects. The modules may be further configured so as to be mounted in an addressable storage medium or to drive one or more processors. Therefore, for example, the modules include components such as software components, object-oriented software components, class components, or task components, processors, functions, attributes, procedures, subroutines, segments of program codes, drivers, firm wares, micro-codes, circuits, data, databases, data structures, tables, arrays, and variables. The operations provided by the components and modules may be combined as smaller components and modules or divided into additional components and modules.

In addition to the above described embodiments, embodiments of the present invention can also be implemented through computer readable code/instructions in/on/by a medium, e.g., a computer readable medium, to control at least one processing element to implement any above described embodiment. The medium can correspond to any medium/media permitting the storing, transmission, and/or implementing of the computer readable code. Thus a medium may be merely another system embodiment of the present invention.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or including carrier waves, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

As described above, according to one or more embodiments of the present invention including an image processing method, medium, and system, it is possible to view displayed images with a sufficiently similar brightness in a low power environment as in the normal power environment.

While aspects of the present invention has been particularly shown and described with reference to differing embodiments thereof, it should be understood that these exemplary embodiments should be considered in a descriptive sense only and not for purposes of limitation. Any narrowing or broadening of functionality or capability of an aspect in one embodiment should not considered as a respective broadening or narrowing of similar features in a different embodiment, i.e., descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. An image processing method, comprising:
    performing a classifying of an input image into one of predetermined image categories based on a feature of a brightness histogram of the input image; and
    adjusting a brightness for pixels of the input image based on -brightness weighting functions corresponding to a result of the classifying of the input image and respective positions of the pixels, such that a classification of the input image into one of the predetermined image categories controls the adjusting of the brightness for the pixels of the input image through application of a corresponding brightness weighting function for that one predetermined image category.

2. The method of claim 1, wherein the brightness weighting functions are grayscale functions and the adjusting of the brightness for the pixels of the input image adjusts a brightness of each pixel individually for providing to an LCD display within a system performing the image processing method.

3. The method of claim 1, wherein the adjusting of the brightness comprises increasing the brightness for the pixels so as to be proportional to a brightness increase rate based on a grayscale function, as the corresponding brightness weighting function, and a gain corresponding to the relative positions of the pixels.

4. The method of claim 3, wherein the gain decreases as the relative positions of the pixels approach a center portion of the input image, and increases as the relative positions of the pixels approach an outer circumference portion of the input image.

5. The method of claim 3, wherein the gain is proportional to an inversed Gaussian function having coordinate variables corresponding to the relative positions of the pixels.

6. The method of claim 1, wherein the adjusting of the brightness is performed when a power decrease rate of a display, at a power level below a normal power level of the display, for displaying the input image is larger than a threshold value.

7. The method of claim 1, wherein the adjusting of the brightness comprises:
increasing the brightness for the pixels of the input image using a grayscale function, corresponding to a resultant categorized predetermined image category of the input image, and a fixed gain corresponding to the resultant categorized image category when the resultant categorized predetermined image category corresponds to a first image category or a second image category, with the first image category representing an image in which a number of pixels having a brightness value larger than a first reference brightness value and a number of pixels having a brightness value smaller than a second reference brightness value are larger than an arbitrary rate and the second image category representing an image in which pixels are discretely distributed to some pixel values; and
increasing the brightness for the pixels of the input image based on the grayscale function corresponding to the resultant categorized predetermined image category and the relative positions of the pixels when the resultant categorized predetermined image category does not correspond to the first image category and the second image category.

8. The method of claim 1, further comprising:
adjusting a contrast for the input image after the adjusting of the brightness for the pixels.

9. The method of claim 8, wherein the adjusting of the contrast comprises decreasing a brightness of a corresponding pixel, according to a second brightness value, when a first average brightness value of the input image is larger than a first brightness of the corresponding pixel,
with the first average brightness value and the first brightness of the corresponding pixel being based on brightness values of the input image observed before the adjusting of the brightness for the pixels, and the second brightness value being based on brightness values of the input image observed after the adjusting of the brightness for the pixels.

10. The method of claim 9, wherein a decreased amount of the decreasing of the brightness of the corresponding pixel according to the second brightness value is proportional to a contrast rate between the first average brightness value and the first brightness value.

11. The method of claim 9, wherein
the adjusting of the contrast further comprises increasing the brightness of the corresponding pixel so as to match a contrast rate between a second average brightness value of pixels included in a predetermined sized mask encompassing at least the corresponding pixel and the second brightness value to a contrast rate between a third average brightness value of pixels encompassed by the mask and the first brightness value, when the first average brightness value is not larger than the second brightness value, and
the third average brightness value is based on the brightness values of the input image observed before the adjusting of the brightness for the pixels.

12. The method of claim 8, further comprising:
adjusting a saturation for the input image after the adjusting of the contrast for the input image.

13. The method of claim 12, wherein
the adjusting of the saturation comprises increasing a saturation of a skin color region corresponding to a previously set hue and saturation in the input image whose contrast is adjusted and a color region other than the skin color region, and
the saturation increase rate of the color region other than the skin color region is larger than the saturation increase rate of the skin color region.

14. An image processing system, comprising:
a classifying unit to perform a classifying of an input image into one of predetermined image categories based on a feature of a brightness histogram of the input image; and
a brightness adjusting unit to adjust a brightness for pixels of the input image based on brightness weighting functions corresponding to a result of the classifying unit and respective positions of the pixels, such that a classification of the input image by the classifying unit into one of the predetermined image categories controls the adjusting of the brightness for the pixels of the input image by the brightness adjusting unit through application of a corresponding brightness weighting function for that one predetermined image category.

15. The system of claim 14, wherein the brightness adjusting unit increases the brightness for the pixels so as to be proportional to a brightness increase rate based on a grayscale function, as a corresponding brightness weighting function, and a gain corresponding to the relative positions of the pixels.

16. The system of claim 15, wherein the gain decreases as the relative positions of the pixels approach a center portion of the input image, and increases as the relative positions of the pixels approach an outer circumference portion of the input image.

17. The system of claim 15, wherein the gain is proportional to an inversed Gaussian function having coordinate variables corresponding to the relative positions of the pixels.

18. The system of claim 14, wherein the brightness adjusting unit adjusts the brightness when a power decrease rate of a display further comprised in the system, at a power level below a normal power level of the display, is larger than a threshold value.

19. The system of claim 14, wherein the brightness adjusting unit comprises:
a fixed gain processing unit increasing the brightness for the pixels of the input image using a grayscale function, corresponding to a resultant categorized predetermined image category of the input image, and a fixed gain corresponding to the resultant categorized predetermined image category, when the resultant categorized predetermined image category is a first image category or a second image category, with the first image category representing an image in which a number of pixels having a brightness value larger than a first reference brightness value and a number of pixels having a brightness value smaller than a second reference brightness value are larger than an arbitrary rate and the second image category representing an image in which pixels are discretely distributed to some pixel values; and a variable gain processing unit increasing the brightness for the pixels of the input image based on the grayscale function corresponding to the resultant categorized predetermined image category and a variable gain corresponding to the relative positions of the pixels, when the resultant categorized predetermined image category does not correspond to the first image category and the second image category.

20. The system of claim 14, further comprising:
a contrast adjusting unit adjusting a contrast for the input image after the adjusting of the brightness of the pixels.

21. The system of claim 20, wherein
the contrast adjusting unit decreases the brightness of a corresponding pixel, according to a second brightness value, when a first average brightness value of the input image is larger than a first brightness of the corresponding pixel, and
the first average brightness value and the first brightness of the corresponding pixel are based on brightness values of the input image observed before the adjusting of the brightness for the pixels, and the second brightness value is based on brightness values of the input image observed after the adjusting of the brightness for the pixels.

22. The system of claim 21, wherein the decreased amount of the decreasing of the brightness of the corresponding pixel according to the second brightness value is proportional to a contrast rate between the first average brightness value and the first brightness value.

23. The system of claim 21, wherein
the contrast adjusting unit increases the brightness of the corresponding pixel so as to match a contrast rate between a second average brightness value of pixels included in a predetermined sized mask encompassing at least the corresponding pixel and the second brightness value to a contrast rate between a third average brightness value of pixels encompassed by the mask and the first brightness value, when the first average brightness value is not larger than the second brightness value, and
the third average brightness value is based on the brightness values of the input image observed before the adjusting of the brightness for the pixels.

24. The system of claim 20, further comprising:
a saturation adjusting unit adjusting a saturation for the input image after the adjusting of the contrast for the input image 25. The system of claim 24, wherein
the saturation adjusting unit increases a saturation of a skin color region corresponding to a previously set hue and saturation in the input image whose contrast is adjusted and a color region other than the skin color region, and
the saturation increase rate of the color region other than the skin color region is larger than the saturation increase rate of the skin color region.

* * * * *

UNITED STATES PATENT AND TRADEMARK OFFICE
CERTIFICATE OF CORRECTION

| | | |
|---|---|---|
| PATENT NO. | : 8,155,465 B2 | Page 1 of 1 |
| APPLICATION NO. | : 11/907710 | |
| DATED | : April 10, 2012 | |
| INVENTOR(S) | : Yang-ho Cho et al. | |

It is certified that error appears in the above-identified patent and that said Letters Patent is hereby corrected as shown below:

Column 14, Line 58, In Claim 1, delete "on -brightness" and insert -- on brightness --, therefor.

Column 18, Line 23, In Claim 24, delete "image" and insert -- image. --, therefor.

Signed and Sealed this
Nineteenth Day of June, 2012

David J. Kappos
*Director of the United States Patent and Trademark Office*